UNITED STATES PATENT OFFICE.

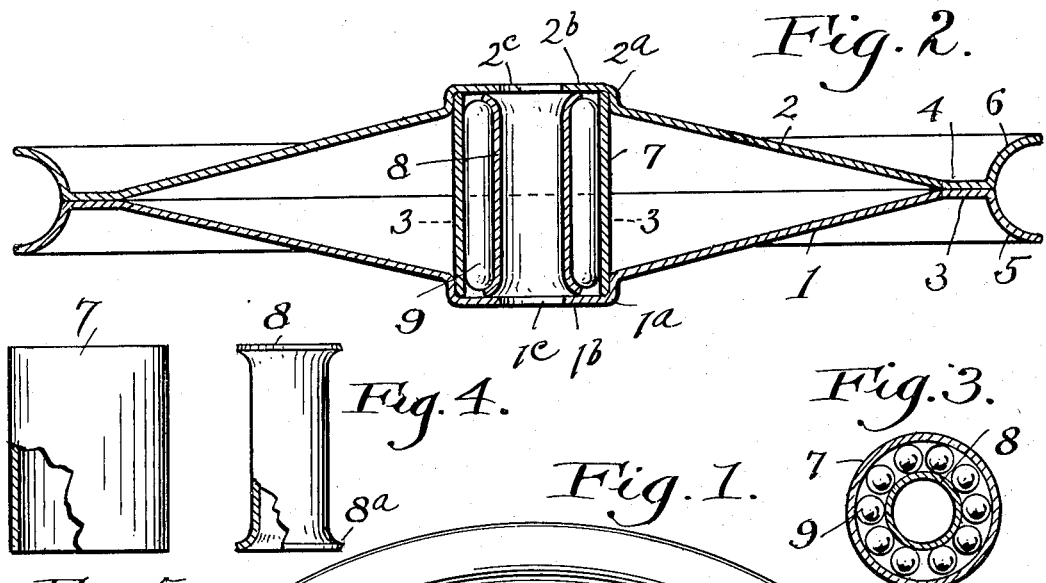

RALPH R. ROOT, OF CLEVELAND, OHIO, ASSIGNOR TO THE GLOBE MACHINE & STAMPING COMPANY, OF CLEVELAND, OHIO, A CORPORATION OF OHIO.

WHEEL.

1,395,734.     Specification of Letters Patent.     Patented Nov. 1, 1921.

Application filed December 20, 1920, Serial No. 431,851. Renewed September 15, 1921. Serial No. 500,955.

*To all whom it may concern:*

Be it known that I, RALPH R. ROOT, a citizen of the United States, residing at Cleveland, in the county of Cuyahoga and State of Ohio, have invented a certain new and useful Improvement in Wheels, of which the following is a full, clear, and exact description.

The present invention relates to a wheel which is preferably made of sheet metal disks in such fashion as to enable the production of the wheel at comparatively low cost and to provide a production in which roller bearings and a roller bearing cage are provided which will prevent the roller bearings from dropping out.

Reference should be had to the accompanying drawings forming a part of this specification in which Figure 1 is a side elevation of the wheel; Fig. 2 is a vertical sectional elevation; Fig. 3 is a section along the line 3—3 of Fig. 2; Fig. 4 is a side elevation with portions in section of a spool; Fig. 5 is a side elevation of a sleeve with portions in section.

The wheel which forms the subject matter of this application, while not specifically limited, to any field of use, is nevertheless, more particularly intended for use on coaster wagons or generally vehicles which are used as toys. In such cases it is generally desired to provide a roller bearing mounting for the wheel but constructions which are at present usually employed do not provide a construction wherein the roller bearings or ball bearings as the case may be, are made up as a part of the wheel, but on the contrary these roller bearings or ball bearings must be removed and replaced whenever the wheel is taken off or put on to the axle of the vehicle to which it is assembled.

In the present construction the roller bearing is to all intents and purposes a part of the wheel so that the wheel may be removed and remounted upon an axle without making necessary the removal and replacement of the roller bearings or ball bearings.

Referring to the drawings, the wheel proper comprises two disk members 1 and 2. These disk members are symmetrical and comprise main body portions which are outwardly flaring through the center as clearly indicated in the drawing. These flaring portions approach each other toward the rim of the wheel and the disks are provided with flat parts 3 and 4 which may be brought into engagement so that the two disks may be spotwelded to each other at this point, or attached by other means. Beyond the parts 3 and 4, the disks are each provided with a quarter round portion such as indicated at 5 and 6 which is adapted to receive a rubber tire. The particular shape of the portions which lie beyond the parts 3 and 4 is immaterial so far as this invention is concerned and other precise structures may be used.

The inner portion of each disk, that is to say, the portion which is adjacent the center of the wheel, is provided with an outwardly extending hub portion such as indicated at $1^a$ and $2^a$ and which hub portion is provided with an inwardly extending flange represented at $1^b$ and $2^b$. There is a central opening through each of the flanges such as indicated at $1^c$ and $2^c$ through which the axle of the wagon or other vehicle is adapted to extend. Within the hub portion $1^a$ and $2^a$ is a cylindrical shell member which is indicated at 7. This member is of a diameter so that it fits against the hub portions $1^a$ and $2^a$ and is of a length such that it engages the inner wall of each flange $1^b$ and $2^b$. This shell or cylindrical member 7 is permanently secured in place as by means of spot welding or any other equivalent fastening means so that the two disks are joined to each other at the hub portion, and additionally the inner surface of the cylindrical portion 7 forms a surface in contact with which roller bearings may roll as subsequently described.

Within the cylindrical member 7 and extending between the flanges $1^b$ and $2^b$ is a spool 8. This spool has its outer ends flared outwardly as indicated at $8^a$. Between the outer surface of the spool 8 and the inner surface of the cylindrical member 7 roller bearings 9 are placed. The central opening through the spool 8 is in line with the openings $1^c$ and $2^c$ in the hubs or bosses on the disks 1 and 2 and hence the axle of a wagon or other vehicle may be passed through the hub of the wheel when secured in position.

In assembling the wheel it will be obvious that the cylindrical member 7 may be assembled with respect to one of the disk hubs after which the spool 8 and the roller bearings may be placed within the hub 7 after which the other of the disks is positioned and secured in the manner which has heretofore been described.

From the construction of the device which has just been described it will be seen that the spool 8 and the roller bearings which were associated with it are not removable from the wheel when the wheel has once been assembled unless one of the disks from which the wheel is formed be disassembled. It therefore follows that the roller bearing is permanently held as a part of the wheel and that the wheel may be mounted or dismounted from an axle without making it necessary to remove the bearings.

The various elements of which the wheel is made up are all made from sheet metal with the exception of the roller bearings themselves, and the various parts described may be formed by drawing operations thereby producing a wheel which may be made at comparatively low cost of manufacture.

Having described my invention, I claim:

1. A wheel comprising two annular parts which are secured together, the central portions of said parts being spaced apart and each provided with a central extension, a hollow cylindrical member within and extending between said extensions, a hollow spool member with flaring portions within the cylindrical member and rollers between the outer surface of the spool member and the inner surface of the cylindrical member and means carried by the boss portions for holding the said spool in position.

2. A wheel comprising two annular parts which are secured together, said parts being spaced apart adjacent their central portion, each of said parts being formed with an outwardly extending boss portion with a depending flange, a cylindrical member within and extending between the said boss portions, a hollow spool member with flaring end portions, said spool member being within the said cylindrical member and extending between the flanges carried by the said bosses and rollers lying between the outer surface of the spool member and the inner surface of the cylindrical member.

3. A wheel having two disk parts, said disk parts flaring outwardly as they approach the center of the wheel, each of said disks being formed with an outwardly extending boss and a flange depending from said boss, a hollow cylindrical member extending between the inner walls of the boss, a spool with flaring end portions located within the hollow cylindrical member and extending between the flanges on the bosses and rollers between the outer surface of the spool and the inner surface of the cylindrical member.

4. A wheel having two disk parts, the outer portions of said disks adjacent the periphery being adjacent to each other, the said disks at their central portions being spaced apart and each having an outwardly extending boss, each boss having an inwardly extending flange, a cylindrical member within and extending between the said boss portions, said cylindrical member being secured to the said boss portions, a hollow spool within the cylindrical member, said spool having outwardly flaring end portions which lie between the said radially extending flanges and rollers between the outer surface of the spool and the inner surface of the cylindrical member.

In testimony whereof, I hereunto affix my signature.

RALPH R. ROOT.